Patented May 3, 1938

2,115,751

UNITED STATES PATENT OFFICE 2,115,751

METAL COMPOUNDS OF NUCLEOPROTEINS AND OF THEIR ORGANIC HYDROLYTIC DECOMPOSITION PRODUCTS AND METHOD OF MAKING SAME

Simon L. Ruskin, New York, N. Y., assignor to Francis R. Ruskin, New York, N. Y.

No Drawing. Application January 4, 1933, Serial No. 650,137

10 Claims. (Cl. 260—11)

This invention relates to organic compounds of metallic substances, more particularly organic compounds of tin, of calcium, of bismuth and of copper, and also organic compounds of iodine, for use in the treatment of diseases.

One object of this invention is to combine tin with nucleoproteins or their hydrolytic decomposition products, the nucleins and particularly with the individual, isolated, nucleotides, nucleosides or the purine or pyrimidine bases derived therefrom, or their combinations with each other, inasmuch as these hydrolytic decomposition products are capable of combining with tin and are of organic chemical nature.

Another object of my invention is the preparation of these compounds by which a chemical combination of the tin with the nucleoproteins, nucleins, nucleotides, nucleosides or the purine or pyrimidine bases derived therefrom may be effected.

Still another object of my invention is the preparation of soluble compounds of tin with nucleoproteins or their hydrolytic decomposition compounds, the nucleins, the isolated nucleotides, nucleosides or the purine and pyrimidine bases derived therefrom which compounds are soluble in water or physiological salt solution and contain 20 per cent. of tin or more.

A further object of my invention is the purification of the crude products obtained by combining tin with nucleoproteins or their hydrolytic decomposition products, the nucleins, the isolated nucleotides, nucleosides, or the purine or pyrimidine bases derived therefrom, in order to produce readily soluble pure compounds which are especially suitable for application in human beings.

Another object of my invention is the preparation of therapeutically valuble compounds similar to the above mentioned tin compounds whereby, in place of tin, calcium; or, as well, bismuth; or copper; or iodine; is combined with nucleoproteins or their hydrolytic decomposition products, the nucleins, and particularly the isolated, individual nucleotides, nucleosides or the purine or pyrimidine bases derived therefrom, or their combination with each other, inasmuch as these hydrolytic decomposition products are capable of combining with calcium, or bismuth, or copper, or iodine, and are of organic chemical nature.

Still another object of my invention is the preparation of soluble compounds of calcium with nucleoproteins or their aforesaid hydrolytic decomposition products which compounds are soluble in water or physiological salt solution and contain 15% of calcium or more.

A further object of my invention is the purification of the crude products obtained by combining calcium with nucleoproteins or their aforesaid hydrolytic decomposition products in order to produce readily soluble compounds which are especially suitable for application in human beings.

Under the expression "nucleoproteins" I understand proteins composed of an albuminous component of varying nature and a second characteristic component which consists of a polynucleotide, the so-called "nucleic acids". They are present in all cell nuclei and are obtained from animal substances as well as vegetable products, such as, e. g., blood corpuscles, yeast and others. They are weak acids and are decomposed by the action of dilute weak acids, or on treating with water alone, or by the action of pepsinehydrochloric acid, whereby their albumen content is reduced or the albumen component is partly decomposed, yielding the so-called "nucleins".

The nucleins as well as the nucleoproteins are split up, e. g., by the action of acids, alkalies or ferments into "nucleotides", the so-called "nucleic acids" and albumen. These nucleotides are composed of "nucleosides" and phosphoric acid and have been isolated in the form of mono-, di- and polynucleotides, i. e., containing one, two or more nucleotide complexes; the di- and polynucleotides are probably formed by combination of the mononucleotides with each other by means of the phopshoric acid residue. The nucleotides are acids, and are decomposed by the action of hot water, ferments, acids or alkalies. Some mononucleotides were isolated from pancreas and from extract of meat, while polynucleotides containing four nucleotides were obtained from vegetable matter (yeast) or animal tissues (thymus, leucocytes, etc.).

The "nucleosides" which, in combination with phosphoric acid, form the nucleotides, are glucosides of various purine and pyrimidine bases, i. e., compounds composed of carbohydrates and these bases. They are obtained by the action of ferments and are finally decomposed into the various "purine" and "pyrimidine" bases, of which the following may be mentioned: thymin, cytosin, uracil, adenin and guanin. These final hydrolytic decomposition products, of course, have also been produced directly f.om nucleoproteins, nucleine and nucleotides by the action of acids or alkalies.

A still further object of the invention is the preparation of compounds similar to the aforesaid tin compounds, and wherein instead of tin, bismuth is combined with neucleoproteins or their hydrolytic decomposition products, the nucleins, nucleotides, nucleosides or the purine or pyrimidine bases derived therefrom.

As the chemical constitution of the compounds comprising the object of this invention and of the starting organic materials is to a great extent still uncertain and the nomenclature is still in a state of considerable confusion, the following table is presented to give a clearer picture as to the scope of the invention and as to the relationship existing between all these compounds.

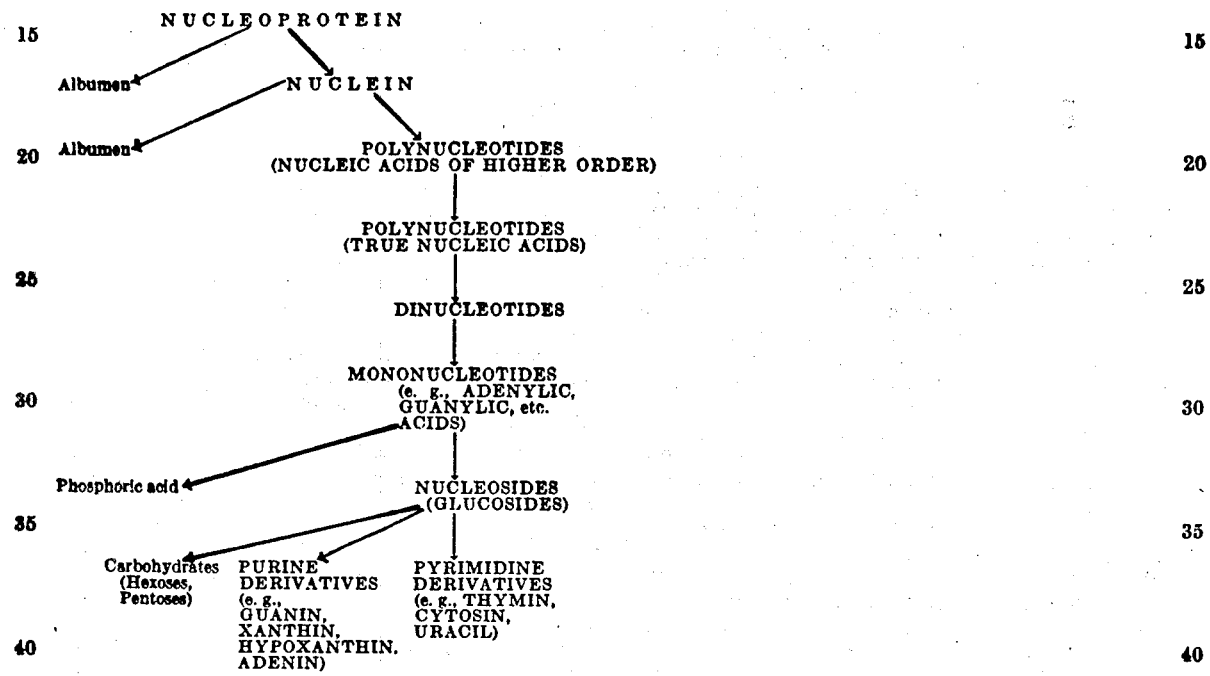

Of course, the invention comprises not only the compounds as obtained by hydrolytic decomposition of nucleoproteins, but also those compounds which are produced synthetically, i. e., in the reverse order of the table.

For the purpose of disclosing my invention I will describe the preparation of the combination of tin with a nucleoprotein, a polynucleotide, a mixture of isolated mononucleotides (guanylic and adenylic acids), and uracil as well as the combination of calcium with a nucleoprotein, a polynucleotide (nucleic acid), an isolated mononucleotide (guanylic acid), and guanin without limiting myself to these products. On the contrary, various modifications in the starting material as well as in the method of production of these metal compounds may be made as will be evident to those skilled in the art. The examples given are only intended to serve as characteristic ways of carrying out the invention.

Example 1

To produce the tin compound of a nucleoprotein, 300 grams of a nucleoprotein, obtained, e. g., from fish sperm by extracting the testicles with water, are dissolved in 3000 c. c. of water, or sufficient water to form a solution, at ordinary temperature.

To this solution a concentrated solution of sodium stannite, obtained by adding a concentrated sodium hydroxide solution to a strongly acid stannous chloride solution until the first formed stannous hydroxide has completely redissolved and then made slightly acid by the addition of acetic acid, while stirring and cooling. Thereby a voluminous precipitate is formed which consists chiefly of the stannous compound of the nucleoprotein used and contains other impurities.

The precipitate is centrifuged, or separated in any other suitable manner, from the mother liquor and washed with a small amount of water or aqueous alcohol to remove the soluble impurities.

The precipitate thus obtained is digested in 3000 c. c. of water and a saturated solution of sodium acetate is slowly added, while stirring, until a complete and clear solution results. The stannous compound of the nucleoprotein is then precipitated by the addition of alcohol or any other suitable precipitating agent and centrifuged or separated from the mother liquor in any other suitable manner. This dissolving of the precipitate in sodium acetate solution and precipitating by alcohol may be repeated until the desired degree of purity is obtained. Finally the precipitated stannous compound is washed several times with absolute alcohol and dried at a low temperature, preferably in a vacuum.

A compound of nucleoprotein and tin is obtained in the form of a yellowish-white, loose powder, which is easily soluble in water and physiological salt solution and contains between 20 and 25 per cent of tin.

Example 2

To produce the tin compound of a polynucleotide, such as nucleic acid, a solution of sodium nucleinate, such as, e. g., obtained from yeast, in water, is run into a solution of sodium stannite, obtained as described in Example 1, while stirring, and the mixture is then made slightly acid by the addition of acetic acid. A precipitate is formed which consists chiefly of stannous nucleinate containing other impurities.

This precipitate is filtered off and washed with water to remove any excess of sodium nucleinate which may be uncombined or any sodium sulphate formed by the reaction.

The well washed precipitate thus obtained is placed in water and a saturated solution of chemically pure sodium acetate is slowly added, while stirring, until the precipitate of stannous nucleinate is completely dissolved. The stannous nucleinate in solution is then precipitated with ethyl alcohol and filtered off, the filter residue being redissolved and reprecipitated until the stannous nucleinate is practically free from all impurities.

There is thus obtained a soluble product in the form of a snow white, loose, hygroscopic powder, easily soluble in water and in physiological salt solution.

Quantitative analysis has shown that the product contains a high percentage of tin, approximately 35 per cent.

Example 3

To produce the stannous compound of a mixture of mononucleotides, the latter are reacted with stannous salts in the following manner:

The mixture of mononucleotides comprising guanylic and adenylic acid may be obtained, e. g., by hydrolysis of nucleic acid with ammonia in an autoclave at 115° C. and repeated crystallizations. Or, it may be produced by dissolving 50 grams of sodium nucleinate (obtained from yeast) in 1250 c. c. of water. Enough potassium hydroxide is added to make its concentration in the solution 1 per cent, i. e., 12.5 grams of potassium hydroxide. After allowing this solution to stand at room temperature for 24 hours, the solution is slightly acidified by the addition of acetic acid and heated to about 70° C. on a water bath. Then it is run in a slight excess of a 25 per cent solution of lead acetate, in order to precipitate the lead salts.

This mixture should be allowed to cool, inasmuch as the lead salts are somewhat soluble while hot. The precipitate is filtered with the aid of suction, the cake is thoroughly washed and suspended in boiling water. Hydrogen sulphide is passed into the suspension to free the nucleotides from the lead. This takes quite a time and should be continued until it is certain that all the lead is changed to the sulphide. The lead sulphide is separated by filtration and air is blown through the filtrate until all of the hydrogen sulphide is removed. It is usually necessary to filter again at this point, due to the formation of a slight turbidity caused by the precipitation of sulphur. The filtrate is distilled in vacuo, keeping the temperature below 50° C. The residue at the end of the distillation should be approximately 25 c. c. Absolute alcohol is then added to precipitate the crude nucleotides. This precipitate consists of a mixture of guanylic, adenylic, and cytidylic acids.

The crude nucleotides are dissolved in twice their weight of hot water and nearly neutralized with ammonia. One and one-half parts of absolute alcohol, based on the weight of the nucleotides, are then added. The ammonium salt of guanylic acid is precipitated. This is filtered off, treated with absolute alcohol and dried in a desiccator.

Lead acetate is added to the filtrate of the ammonium salt of guanylic acid to precipitate the nucleotides which are present. The lead salt is filtered off in a similar manner to that given above, and the precipitate is then suspended in boiling water. Hydrogen sulphide is let into the suspension to precipitate lead sulphide and free the nucleotides. The filtrate is freed from hydrogen sulphide by passing a current of air through the solution, after which it is necessary to filter in order to free the filtrate from any precipitated sulphide. The filtrate is then distilled in vacuo, the temperature not being allowed to exceed 50° C. until 25 c. c. of a residue are obtained. Adenylic acid is precipitated by adding absolute alcohol.

In order to produce the tin compound of the above described two mononucleotides, guanylic and adenylic acid, stannous sulphide is added to the solution of the mixed acids in water until additions cause no further precipitation. The precipitate formed is filtered off and washed with a small amount of water. It is then suspended in water and a saturated solution of sodium acetate is run in. Since the stannous nucleotides do not dissolve so readily as the crude stannous nucleinate, the residue is filtered off, after as much as possible has dissolved, and redigested with an additional amount of water and saturated sodium acetate. This procedure is continued until the filtrate shows no test for stannous nucleotide, i. e., no precipitation on the addition of large amounts of alcohol.

The filtrates from all these extractions are then mixed and alcohol added to precipitate the stannous compounds completely. The precipitate is filtered off with suction and redissolved in water. It is necessary to repeat the extraction several times to get all the stannous nucleotides into solution. The filtrates are combined and precipitated with alcohol and this procedure of putting the nucleotide in solution and reprecipitation is continued until the desired degree of purity is obtained. The precipitate is sucked dry on a vacuum funnel, treated with absolute alcohol and placed in a desiccator to dry.

Thus a product is obtained which represents a mixture of the stannous compounds of the two mononucleotides, guanylic and adenylic acid, and which, in its pure state is soluble in water and physiological salt solution.

Example 4

To produce the tin compound of a final hydrolytic decomposition product of nucleoproteins, uracil is dissolved in a molecular proportion of sodium hydroxide and then a stannous acetate solution is added. The solution is filtered and the filtrate allowed to stand. The tin compound of uracil is formed, filtered, washed with alcohol and dried over sulfuric acid. It is a snow white amorphous mass.

Example 5

The calcium compound of a nucleoprotein is obtained in a similar way as the tin compound by adding a concentrated aqueous solution of a nucleoprotein, e. g., obtained from leucocytes, to a concentrated solution of calcium chloride. The solution is then neutralized with a sodium hydroxide solution while stirring and cooling.

The precipitate is filtered and dissolved in a concentrated solution of sodium acetate. The clear solution is mixed with alcohol and the precipitate formed filtered, washed with alcohol and dried in a vacuum.

A compound of nucleoprotein and calcium is obtained in the form of a white powder which is easily soluble in water and physiological salt solution and contains between 20 and 25 per cent. of calcium.

Example 6

The calcium compound of a polynucleotide, such as nucleic acid, is prepared by adding a concentrated solution of calcium chloride to a concentrated solution of sodium nucleinate, such as, e. g., obtained from yeast, filtering the precipitate and washing it with small amounts of water, dissolving it in a concentrated sodium acetate solution and reprecipitating it by the addition of alcohol. The filtered product is redissolved and reprecipitated until the calcium nucleinate is practically free from all impurities.

Thus a soluble product is obtained in the form of a snow-white, loose, hygroscopic powder, easily soluble in water and physiological salt solution and containing about 30 per cent. of calcium.

Example 7

To produce the calcium compound of a mononucleotide, the ammonium salt of guanylic acid, obtained for example according to the directions given in Example 3, is dissolved in water, a solution of calcium monophosphate is added and the precipitate, obtained by neutralizing the solution with sodium hydroxide, is filtered, washed with a small amount of water, and then purified by repeated dissolving and precipitating according to the method described in Example 6.

The pure calcium compound of guanylic acid is obtained which is easily soluble in water and physiological salt solution.

Example 8

The calcium compound of a final hydrolytic decomposition product of nucleoproteins, such as guanine, is obtained by dissolving guanine in a molecular proportion of sodium hydroxide and adding thereto an equimolecular solution of calcium acetate. The solution is filtered, the filtrate concentrated by evaporation until crystals form on cooling. The product is then filtered, washed with very little water, then with alcohol and finally with ether and dried in a vacuum.

Example 9

To produce bismuth compounds of a nucleotide, for instance, the mixture of nucleotides, as described in Example 3, said nucleotides are added to a solution of, for instance, an acid solution of bismuth chloride. The solution is then neutralized with sodium hydroxide solution, the precipitate is separated, and purified, by redissolving and reprecipitating as described in Example 3 for the tin compound. The bismuth product contains about 30 per cent. of bismuth and represents a yellowish powder soluble in water and physiological salt solution.

In these examples, of course, the tin compound may be obtained by adding the solution of the nucleoprotein or its hydrolytic decomposition products to the solution of the tin salt, instead of working as described. Instead of sodium stannite other stannous compounds, such as stannous chloride, stannous sulphate or potassium stannite or the like, or stannic compounds such as sodium or potassium stannates or ammonium stannic chloride or the like, or other compounds of tin capable of combining with nucleoproteins and their decomposition products, may be used.

Copper compounds can be produced in a similar manner as the tin and bismuth compounds, any suitable copper salt being used in the process. The iodine compounds may be produced by the action of iodine on the nucleoproteins or their derivatives or in any other suitable manner.

The calcium compounds, of course, may also be obtained by adding the solution of the nucleoprotein or its hydrolytic decomposition product to the solution of the calcium salt. Other calcium salts as the already mentioned compounds may be used, provided they are capable of combining with nucleoproteins or their derivatives.

As starting materials may be used the alkali salts of the nucleoproteins and their decomposition products or any other soluble compound of said products capable of combining with tin or calcium, such as, e. g., the free acids themselves.

Separation of the crude precipitate as well as of the purified compound may be carried out in any suitable manner, by filtering, centrifuging, pressing through a filter press, decanting and any other suitable way.

Dissolving the crude product in water, in order to purify it, may also be done by extracting the precipitate in suitable extraction apparatus, by macerating or by any other suitable method, while stirring or shaking at ordinary or elevated temperature. Extraction is especially advisable in the case of the more difficultly soluble compounds of mononucleotides.

Instead of sodium acetate other salt solutions, such as potassium acetate, sodium chloride, sodium nitrate and others may be used.

As a precipitating agent one may employ benzene, ether or any other organic liquid in which the stannous compound produced is insoluble.

The drying may be effected at ordinary or increased temperature, in a vacuum or by means of an air current or in any other suitable manner whereby the stannous compound is not decomposed.

The reaction products of tin or calcium on the one hand and nucleoproteins or their hydrolytic decomposition products on the other hand can be purified in another manner than by redissolving and reprecipitating, e. g., by recrystallization, or by any other suitable method.

Thus the invention is not limited to the specific examples given, as modifications may be made by those skilled in the art in accordance with the principles herein set forth.

It has been found by bacteriological tests that the organic tin and calcium compounds thus produced inhibit the propagation of certain disease germs while at the same time their solutions do not have a deleterious effect on animal tissues, rendering them of great value as antiseptics and germicides.

Another great advantage consists in the fact that these combinations of tin and calcium and nucleoproteins or their hydrolytic decomposition products have a very great stimulating effect upon the reticulo-endothelial system so that they are of great value in the treatment of diseases caused by deficiencies of this system, such as agranulocytosis, benzene poisoning, X-ray poisoning and various leocopenias incident to exhaustion of the reticulo-endothelial systems. Their application in these hitherto fatal diseases has effected a remarkable lowering of the mortality.

A still more remarkable quality of the tin and calcium compounds of nucleoproteins or their hydrolytic decomposition products consists in their capacity of immunizing bodies against staphylococcus in the human and animal systems. Thus they represent almost specific medicines in staphylococcus infections.

By the term "nucleoproteins" as used herein, it is intended to cover the nucleoproteins and their organic hydrolytic decomposition products. By the term "purines", it is intended to cover purine and its alkyl, hydroxy and amino substitution products. By the term "pyrimidines", it is intended to cover pyrimidines and its alkyl, hydroxy and amino substitution products.

What I claim is:

1. As a therapeutic agent, a compound of tin and a radical of the group consisting of nucleoproteins, nucleic acids, nucleotides and the lower hydrolytic decomposition products containing a pyrimidine ring in the molecule.

2. The combination of tin and a nucleotide.

3. As a therapeutic agent, an isolated nucleotide compound of tin.

4. As a therapeutic agent, isolated tin adenylate.

5. As a therapeutic agent, the isolated tin compound of a purine nucleotide substantially free of pyrimidine nucleotides.

6. As a therapeutic agent, the isolated tin compound of the pyrimidine nucelotides substantially free of purine nucleotides.

7. As a therapeutic agent, the combination of tin and a pyrimidine ring compound obtainable by decomposition of a nucleoprotein.

8. The combination product of tin with nucleic acid, said combination being soluble in water and physiological salt solution.

9. The combination product of tin with a nucleotide, said combination being soluble in water and physiological salt solution.

10. As a therapeutic agent, a tin compound of a nucleoprotein.

SIMON L. RUSKIN.